June 30, 1964 V. H. HALL 3,138,892
FISHING LURE
Filed Aug. 2, 1961
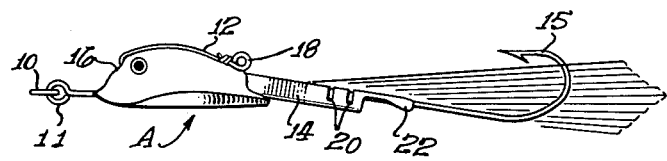
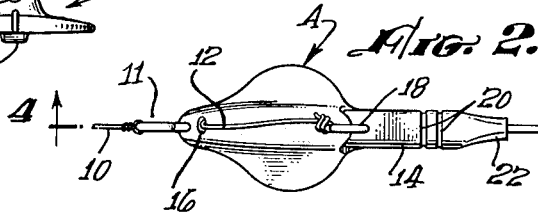
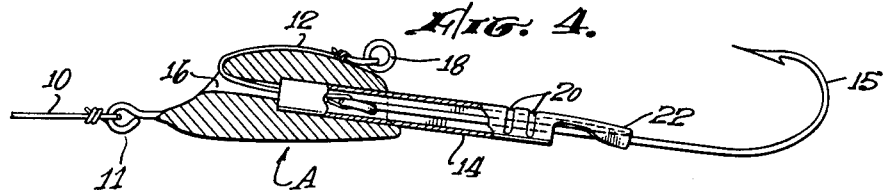
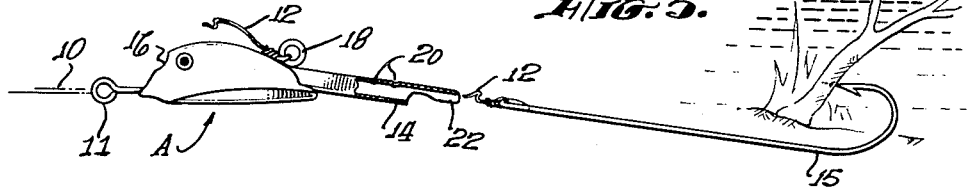
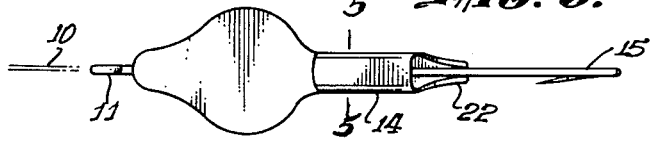
Virgil H. Hall
INVENTOR.
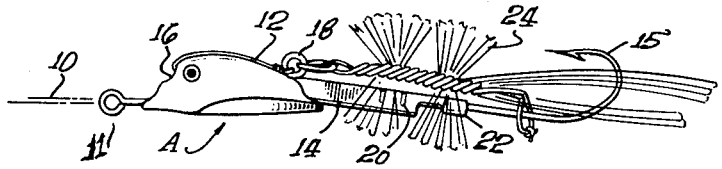

United States Patent Office 3,138,892
Patented June 30, 1964

3,138,892
FISHING LURE
Virgil H. Hall, 632 N. Leonard St., Montebello, Calif.
Filed Aug. 2, 1961, Ser. No. 128,850
3 Claims. (Cl. 43—42.25)

The invention relates to jig-type fishing lure with attachments. It is designed principally to catch bottom-feeding fish and, more particularly, fish of the bass family, although it is not limited to this type of fishing.

The chief purpose of the invention is to create a new device designed to save the fisherman the loss of many costly lures which results from snagging the hook on foreign objects encountered in bottom fishing, by providing certain devices attached to the body that will allow the fish hook to break away from the body when firmly snagged. The body of the jig is so designed as to avoid this hazard to a great degree, as will be described below in detail; however, the main object is to avoid the loss of the entire lure solely because of a snagged hook which can be replaced quickly and economically. Another feature is that a hook deeply imbedded in a caught fish can be broken off from the jig body by a pull on the line rather than lose prime fishing time attempting to extricate the hook with the jig and lure intact.

The disclosed jig differs from the conventional jigs in that it is so constructed that when the hook is snagged, instead of the line breaking, the leader which connects the hook to the body breaks because it is only approximately half the strength of the fishing line. Example: Using a twenty-pound line, the correct strength of the leader attached would be about ten pounds. Other types of jigs are made with the hook molded into and becoming a part of the body, and if the line breaks when snagged the entire lure is lost. With this device the only part of the lure that is lost is the hook, which is replaceable for only a few cents. A ten-pound leader, for instance, is strong enough to land a fish whose weight and strength are comparable to, or slightly more than, the strength of the single-strand leader, yet will allow the hook to separate when snagged without losing the lure.

In the accompanying drawing, which illustrates one embodiment of the invention and wherein characters of reference indicate corresponding parts in all the views;

FIG. 1 is a side elevational view of the lure.

FIG. 2 is a top plan view of the jig.

FIG. 3 is a front elevational view of the device shown in FIGS. 1 and 2.

FIG. 4 is a longitudinal sectional view of the lure as taken along line 4—4 of FIG. 2.

FIG. 5 is a side elevational view similar to FIG. 1, but after the hook has broken loose from the body of the lure.

FIG. 6 is a bottom plan view of the lure shown in FIG. 1.

FIG. 7 is a side elevational view of the lure of FIG. 1 with an attachment to further enhance the appearance of the jig.

Referring to the drawing, 10 designates an ordinary fishing line, 11 an eye for attaching the jig to the line, 12 a fish hook leader, 14 a metal tube receptacle, 15 an ordinary fish hook, 16 a central channel formed in the body, 18 a lure anchor, 20 a grooved area on the tube as a lure seat, 22 a centering guide for the hook, and 24 a detachable lure, all of which parts are connected with device A, which constitutes the subject of the invention.

The device A is composed of lead or other malleable metal formed to resemble the head or frontal portion of a small fish or eel, and when properly dressed may be made to resemble any one of the commonly known water insects or other creatures. The nose and back are shaped similar to a fish with the sides curving downward, and at the bottom the body is flared in all directions from the center, forming a flat, or slightly rounded, bottom and appears egg-shaped from the bottom view, coming to a point at the front end. The shape can be modified somewhat so long as the proper balance is maintained. The other permanently attached body parts are made of steel or a similar metal, and the lures to be attached may be of either metal, fabric, rubber or whatever the user chooses to attach thereto.

The manner of making and assembling the jig is to join the body A, the metal tube receptacle, 14, the front eye, 11, the central channel, 16, and the lure anchor, 18, together so that they constitute an integral device. The fish hook, 15, being detachable, is inserted into the tube, 14, and anchored to the body A, by attaching a length of leader 12 to the hook and drawing it through the tube, 14, through the channel 16, then back over the top of the body A, and securing it to the lure anchor 18. Attaching the hook 15, and the lure 24, may be done at any time after the body parts are assembled because the hook and lure are detachable.

The method of using the jig is to attach it to any lure-casting fishing rig, usually a spin-fishing outfit using a monofilament line, and jiggling it up and down in the water or allowing it to settle to the bottom and dragging it along in short jerks and other varied movements. It is especially suitable for use around trees, brush and rocky bottoms.

The body A is so designed in shape and balance that it will descend to the bottom in a forward, angular movement and land in an upright position, thus keeping the point of the hook upward at all times to avoid snagging.

The metal tube 14, when viewed from the rear, is rectangular in shape, with the horizontal diameter perpendicular to the upright position of the body A. The tube is used to provide a smooth raceway through which the hook may escape when the hook-leader 12, is broken. The size of the tube is determined by the size of the hook used and may vary from 1/16" deep x 3/16" wide, inside diameter, to larger proportionate dimensions to fit the size of the eye of the hook used. The length of the tube is in proportion to the length of the hook used, which is preferably the long-shank type. The horizontal diameter of the tube taken along line 5—5 of FIG. 6 is such that the flat side of the eye of the hook is held in a horizontal position with the hook point upward and prevents the hook from turning inside the tube. Stainless steel is used to prevent rust and corrosion, although other types of metal can be used. The tube 14 is oriented in the body so that it is inclined downwardly and rearwardly five to ten degrees from the horizontal. This reduces the tendency of the hook to drag against the bottom wall of the tube when a direct line pull is made on a snagged hook. The hook must be freely suspended by the leader, 12, in order that the break-away action will not be impeded by drag or friction.

The hook-leader, 12, is a piece of nylon monofilament line, or similar material, long enough to be attached to the eye of the hook and extend from its normal position in the body, through the frontal portion of the body, and be tied to the lure-anchor, 18, or the front eye, 11. The strength of the leader should not be more than half that of the fishing line according to manufacturer's tested strength. This provides the escape or break-away feature, i.e., the leader breaks away under the stress of a stronger line when firmly snagged.

The hook-leader channel, 16, approximately 1/16 inch in diameter, is round, about 1/4 inch long, is formed when the body is formed and extends from the front end of the metal tube, 14, through the nose of the body A, and is a passage-way for the hook leader, 12. This must be smooth and free from sharp edges which might chafe or cut the leader.

The lure-anchor, 18, is an eye made of steel wire, to hold a detachable lure. It is set in the top rear portion of the body A, to which may be attached any type of lure desired, e.g., pork rind, hackle lure, plastic worm, etc., to extend back over the fish hook, 15.

The lure-seat, 20, is a groved area in the rear portion of the metal tube, 14, providing a non-slip surface onto which bucktails or other lures may be tied or attached.

The hook-centering guide, 22, is a portion of the tail of the metal tube, 14, extended and swaged or formed to fit the shank of the hook so as to prevent excessive side-wobble, yet not preventing the escape of the hook.

The detachable lure, 24, is an imitation of a waterbeetle, or other insect, and consists of rubber threads or other materials resembling hackles enmeshed between wires twisted together spirally. It has a ring on the front end for attaching it to the lure-anchor, 18, and is stabilized at the rear end by a loop formed in the wire. The loop is large enough to loosely fit around the hook shank, thus permitting the hook eye to pass through. Since the jig alone is not very attractive, the hackle lure is a very essential part of the means of attracting a fish.

The front eye, 11, connecting the body, A, to the fishing line, 10, is set in the front end of the jig body. This helps to eliminate or reduce friction of the hook shank against the bottom wall of the metal tube, 14, in the event of a direct pull against the point of the hook, and also to prevent lodging the body on foreign objects. Most conventional jigs carry the eye in the top of the body, thus inviting lodging the body on a straight-forward pull. The entire lure, except the fish hook, has sufficient "pitch" or "draft" from front to rear to make it almost impossible to lodge the body against foreign objects.

The device is equipped to receive various types of hooks of standard manufacture so that the fisherman does not have to depend on a specially designed hook. The straight patterned hook with a long shank, however, is the best, as it is less likely to snag than an offset hook.

From the foregoing description taken in connection with the accompanying drawing the advantages of the construction and method of operation will be readily understood by those skilled in the art to which the invention appertains. While I have described the principle of operation, together with the device which I now consider to be the best embodiment thereof, I desire to have it understood that the device shown is merely illustrative and that such changes may be made as fall within the scope of the appended claims when desired.

Having thus described my invention, I claim and desire to secure by Letters Patent:

1. In a jig type fishing lure, the combination of a lure body, a fishing line secured to the front thereof, a leader having a breaking strength of a value lower than that of the said fishing line, a hook secured to said leader and an anchor element on the outer portion of the lure body, the said lure body being provided with a longitudinal channel forming a socket at the rear end thereof, a tubular metal extension in said socket and in which the hook is received and guided, the leader being connected to the front of the hook, guided thru the front portion of the metal tubular extension, the longitudinal channel and finally secured to the anchor element, and to which anchor element is detachably connected a rubber thread hackle lure to enhance the attractiveness of the jig type fishing lure.

2. A lure as set forth in claim 1 in which the metal tubular extension is of rectangular configuration to guide an eye on the hook and hold the hook upright and in which the rear portion of the metal tubular extension is provided with a downwardly slotted extension to further guide the hook and prevent wobble.

3. A lure as set forth in claim 1, in which the hackle lure consisting of rubber threads spirally wrapped in twisted wires is detachably connected to the anchor element by the use of a wire loop connected to the front end of the said hackle lure to engage the eye of the anchor element on the lure body, while the rear end of the said hackle lure is stabilized by having a larger flexible loop loosely fitted around the shank of the fish hook, thus allowing the tail portion of the hackles to drape backwardly over the hook to obscure it from the vision of a fish.

References Cited in the file of this patent

UNITED STATES PATENTS

| | | |
|---|---|---|
| 1,033,464 | Pomeroy | July 23, 1912 |
| 1,296,370 | Darling | Mar. 4, 1919 |
| 2,013,898 | Ridenour | Sept. 10, 1935 |
| 2,164,415 | Mallett | July 4, 1939 |
| 2,427,267 | Fiskaali | Sept. 9, 1947 |
| 2,490,460 | McAvoy | Dec. 6, 1949 |
| 2,539,234 | Dobkowski | Jan. 23, 1951 |
| 2,587,366 | Montali | Feb. 26, 1952 |
| 2,710,479 | Gehrig | June 14, 1955 |
| 2,712,196 | Allen | July 5, 1955 |
| 2,768,468 | Kibler et al. | Oct. 30, 1956 |
| 2,884,733 | Smith | May 5, 1959 |
| 2,980,050 | Murray | Apr. 18, 1961 |
| 2,986,838 | Smyser | June 6, 1961 |
| 3,091,885 | Ulsh | June 4, 1963 |

FOREIGN PATENTS

| | | |
|---|---|---|
| 587,043 | Canada | Nov. 17, 1959 |